United States Patent
Kollmann et al.

(10) Patent No.: US 11,746,837 B2
(45) Date of Patent: Sep. 5, 2023

(54) METHOD FOR CONTROLLING A CLUTCH UNIT

(71) Applicant: MAGNA Powertrain GmbH & Co KG, Lannach (AT)

(72) Inventors: Michael Kollmann, Köflach (AT); Jan Wiechmann, Neutillmitsch (AT)

(73) Assignee: MAGNA POWERTRAIN GMBH & CO KG, Lannach (AT)

( * ) Notice: Subject to any disclaimer, the term of this patent is extended or adjusted under 35 U.S.C. 154(b) by 72 days.

(21) Appl. No.: 17/599,242

(22) PCT Filed: Mar. 9, 2020

(86) PCT No.: PCT/EP2020/056139
§ 371 (c)(1),
(2) Date: Sep. 28, 2021

(87) PCT Pub. No.: WO2020/200659
PCT Pub. Date: Oct. 8, 2020

(65) Prior Publication Data
US 2022/0186795 A1    Jun. 16, 2022

(30) Foreign Application Priority Data
Mar. 29, 2019    (DE) .......................... 102019204438.7

(51) Int. Cl.
*F16D 48/06* (2006.01)
(52) U.S. Cl.
CPC ...... *F16D 48/06* (2013.01); *F16D 2500/1045* (2013.01); *F16D 2500/3056* (2013.01);
(Continued)

(58) Field of Classification Search
CPC ............. F16D 48/06; F16D 2500/1045; F16D 2500/30426; F16D 2500/3056;
(Continued)

(56) References Cited

U.S. PATENT DOCUMENTS

| | | | |
|---|---|---|---|
| 8,234,050 B2 * | 7/2012 | Burns | ............... B60W 30/1843 701/67 |
| 2011/0166760 A1 | 7/2011 | Kiessner-Haiden | |

(Continued)

FOREIGN PATENT DOCUMENTS

| | | |
|---|---|---|
| CN | 103260986 A | 8/2013 |
| CN | 105840686 A | 8/2016 |

(Continued)

OTHER PUBLICATIONS

German Search Results for DE 10 2019 204 438.7, dated Nov. 15, 2019, 2 pages.

(Continued)

*Primary Examiner* — Edwin A Young
(74) *Attorney, Agent, or Firm* — Dickinson Wright PLLC

(57) ABSTRACT

A method for controlling a clutch unit for a drive train of a motor vehicle, wherein the clutch unit comprises a wet-running friction clutch for controllably transmitting torque from an input element to an output element of the clutch unit, wherein the clutch unit comprises oil for cooling the friction clutch, wherein heat inputs which contribute to heating the oil of the clutch unit are calculated, heat outflows which contribute to cooling the oil of the clutch unit are calculated and, as a function of the heat inputs and heat outflows, a maximum admissible clutch torque is calculated, and wherein the current clutch torque of the friction clutch is limited to the maximum admissible clutch torque.

20 Claims, 1 Drawing Sheet

(52) U.S. Cl.
CPC .............. *F16D 2500/30426* (2013.01); *F16D 2500/30822* (2013.01); *F16D 2500/5106* (2013.01); *F16D 2500/7044* (2013.01); *F16D 2500/70689* (2013.01)

(58) Field of Classification Search
CPC ... F16D 2500/30822; F16D 2500/5106; F16D 2500/7044; F16D 2500/70689
See application file for complete search history.

(56) References Cited

U.S. PATENT DOCUMENTS

2012/0024653 A1* 2/2012 Ergun .................. F16D 48/064
192/82 T
2015/0005136 A1* 1/2015 Schmoll Genannt Eisenwerth ....
F02N 11/08
477/174

FOREIGN PATENT DOCUMENTS

| DE | 102008026553 A1 | 12/2009 |
| DE | 102008032476 A1 | 1/2010 |
| DE | 102008043963 A1 | 5/2010 |
| DE | 102016113444 A1 | 1/2017 |
| DE | 102015116567 A1 | 3/2017 |
| JP | 2018115683 A | 7/2018 |
| WO | 0223066 A1 | 3/2002 |

OTHER PUBLICATIONS

International Search Report for PCT/EP2020/056139, dated Jun. 5, 2020, 2 Pages.

\* cited by examiner

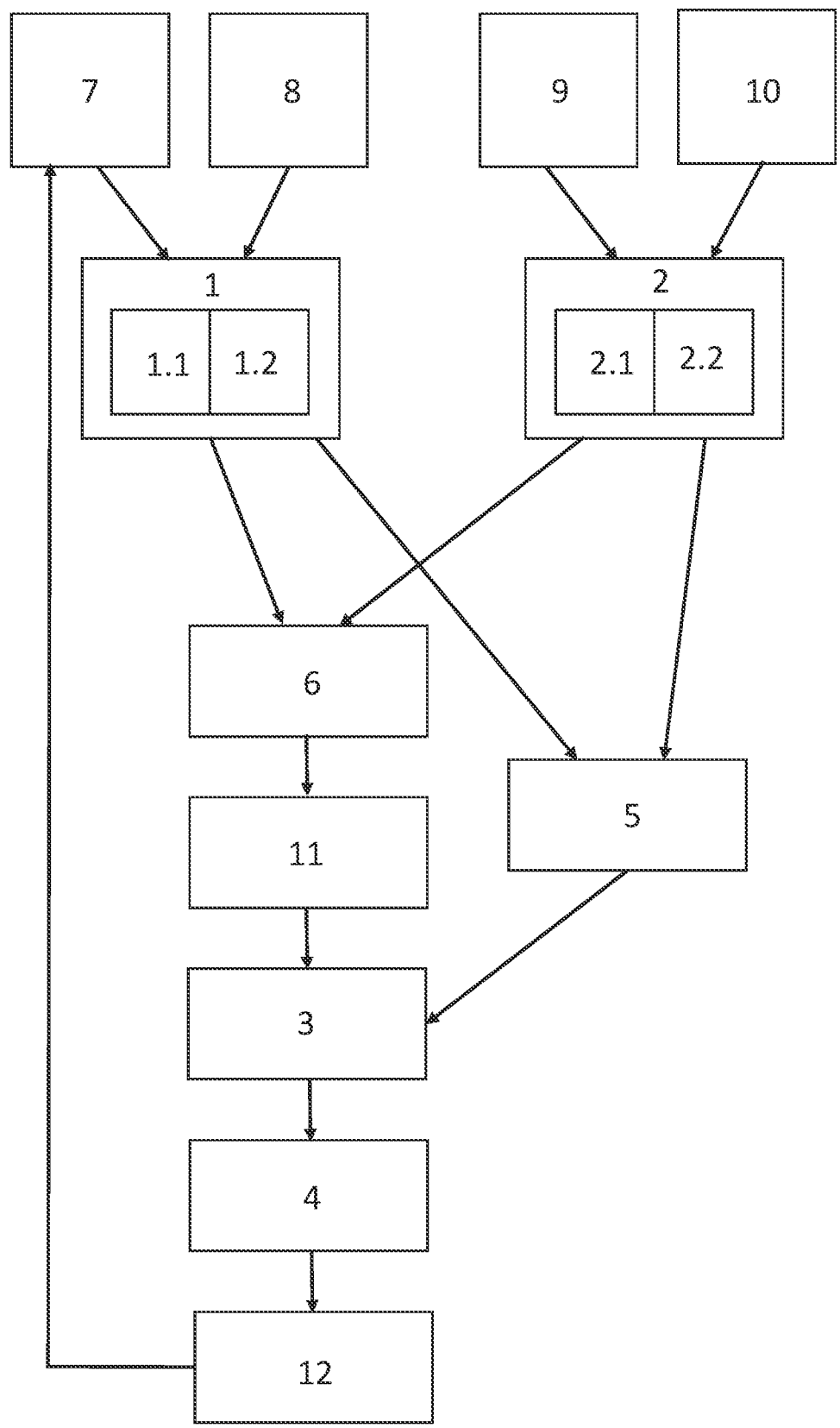

METHOD FOR CONTROLLING A CLUTCH UNIT

CROSS-REFERENCE TO RELATED APPLICATIONS

This application is a National Stage of International Application No. PCT/EP2020/056139, filed Mar. 9, 2020, which claims priority to DE102019204438.7, filed Mar. 29, 2019. The entire disclosures of each of the above applications are incorporated herein by reference.

FIELD OF THE INVENTION

The present invention relates to a method for controlling a clutch unit for a drive train of a motor vehicle and to a torque transmission arrangement which has an input element, an output element, a control device and a clutch unit.

BACKGROUND OF THE INVENTION

This section provides information related to the present disclosure which is not necessarily prior art.

Clutch units for a drive train of a motor vehicle, wherein the clutch unit comprises a wet-running friction clutch for controllably transmitting torque from an input element to an output element of the clutch unit, are known per se.

Such a clutch unit serves for example in a transfer case of a motor vehicle with all-wheel drive for controllably transmitting drive torque to a primary axle and/or secondary axle of the motor vehicle. In such a "torque on demand" transfer case, the wheels of the primary axle are permanently driven, while a proportion of the drive torque can optionally be transmitted to the wheels of the secondary axle by means of the stated clutch unit. The transfer case may for example also take the form of a controllable center differential, in which the clutch unit is associated with a differential lock for adjusting the distribution of the drive torque in the longitudinal direction of the vehicle. A clutch unit of the stated kind may be applied in a torque transmission arrangement which, in a motor vehicle with a permanently driven front axle, permits the transmission of a proportion of the drive torque to the rear axle, wherein the unit is arranged for example on the front axle differential or rear axle differential.

A clutch unit of the initially stated type may also act in the transverse direction of the motor vehicle, for example for a differential lock of an axle differential or in a torque superimposition arrangement of an axle differential ("torque vectoring").

In all of the above-stated cases, the clutch unit can frictionally connect a rotating input element, in particular an input shaft, and a rotating output element, in particular an output shaft, to one another in order transmit drive torque.

When such clutch units are in operation, it is conventionally necessary not only to ensure controlled engagement of the friction clutch but often also extended operation at a precisely adjusted clutch torque, for which reason the friction clutch conventionally takes the form of a wet-running multiplate clutch in the above-stated applications. The friction clutch is typically integrated in a casing which contains oil for cooling and lubricating the friction components. For example, an oil sump is provided at the bottom of the casing, from which an oil pump constantly delivers oil during clutch operation and trickles it onto the friction surfaces. The oil returns from the friction surfaces to the oil sump.

As is known, the oil heats up during operation of such a clutch unit. In the event of the oil becoming excessively hot, in particular during high-speed operation of the motor vehicle, all-wheel drive is therefore conventionally discontinued. However, as a result, the motor vehicle's driving performance is reduced in situations in which all-wheel drive would be desirable from a driving dynamics standpoint.

SUMMARY OF THE INVENTION

This section provides a general summary of the disclosure, and is not a comprehensive disclosure of its full scope or all of its features.

It is an object of the invention to provide a method for controlling a clutch unit for a drive train of a motor vehicle, in which the driving behavior of the motor vehicle is improved under elevated load of the clutch unit, in particular at high motor vehicle speeds. A further object is to provide a torque transmission arrangement with such a clutch unit and a control device, wherein the driving behavior of the motor vehicle is in turn improved under elevated load of the clutch unit, in particular at high motor vehicle speeds.

The object is achieved by a method for controlling a clutch unit for a drive train of a motor vehicle, wherein the clutch unit comprises a wet-running friction clutch for controllably transmitting torque from an input element to an output element of the clutch unit, wherein the clutch unit comprises oil for cooling the friction clutch, wherein heat inputs which contribute to heating the oil of the clutch unit are calculated, heat outflows which contribute to cooling the oil of the clutch unit are calculated and, as a function of the heat inputs and heat outflows, a maximum admissible clutch torque is calculated, and wherein the current clutch torque of the friction clutch is limited to the maximum admissible clutch torque.

According to the invention, a thermal balance for the oil of a clutch unit is prepared, in which on the one hand heat inputs into the oil of the clutch unit are determined, which inputs conventionally depend on the power transmitted by the clutch, i.e. a thermal input power, and on the other hand heat outflows are determined, in particular heat dissipation to the surroundings of the clutch unit, i.e. a thermal output power. Summing the supplied and dissipated heat provides an accurate picture of the temperature situation, in particular also of the current temperature, for the oil of the clutch unit. Conclusions as to the oil temperature in the clutch unit for a subsequent time interval can drawn by integrating changes in temperature over time. Heat inputs and heat dissipation can then in turn be determined for the subsequent time interval. In this manner, the oil temperature can be determined for various subsequent points in time.

According to the invention, knowledge about the thermal balance of the oil is used as the basis for influencing the current clutch torque of the friction clutch. The actual clutch torque is limited according to the invention in order to rule out any undesirably high or lengthy increase in oil temperature. On the basis of the thermal balance, a maximum admissible clutch torque is therefore determined which for example results in no further heating of the oil or merely in tolerable further heating of the oil, such that a maximum temperature is not exceeded.

According to the invention, all-wheel drive is thus not simply discontinued in order to avoid overheating the oil in the clutch unit, but instead all-wheel drive, or other operation of a transmission with the necessary clutch torque, still remains possible in controlled manner, whereby the drive dynamics of the motor vehicle are improved in comparison with conventional operating methods.

Calculation of the heat inputs which contribute to heating the oil of the clutch unit preferably comprises torque-dependent heat inputs, in particular the current torque of the drive train on the output element side, particularly preferably a torque of a propeller shaft.

Calculation of the heat inputs which contribute to heating the oil of the clutch unit preferably comprises rotational speed-dependent heat inputs, in particular the current rotational speed of the drive train on the output element side, particularly preferably a rotational speed of propeller shaft.

Calculation of the heat outflows which contribute to cooling the oil of the clutch unit preferably comprises heat outflows to adjacent components and/or heat outflows to the ambient air. In particular, a measured ambient temperature and/or a measured temperature in the oil sump of the clutch unit may be used for calculating heat dissipation.

A limiting clutch torque is preferably calculated as a function of the heat inputs and heat outflows, wherein the limiting clutch torque consists, on application of the limiting clutch torque to the friction clutch, in the oil of the clutch unit being no further heated. On application of the limiting clutch torque to the friction clutch, the oil of the clutch unit preferably also cools no further, such that the temperature of the oil of the clutch unit remains constant. Heat inputs and heat outflows thus remain in balance on application of the limiting clutch torque.

The current temperature of the oil of the clutch unit may preferably be calculated as a function of the heat inputs and the heat outflows.

The maximum admissible clutch torque which is used to limit the current clutch torque is preferably calculated as a function of the limiting clutch torque and/or as a function of the current temperature of the oil of the clutch unit, in particular as a function of the limiting clutch torque and of the current temperature of the oil of the clutch unit.

The maximum admissible clutch torque is particularly preferably calculated by interpolation between the limiting clutch torque and a maximum clutch torque, wherein the interpolation factor is dependent on the current temperature of the oil of the clutch unit. The admissible torque is preferably obtained from a linear interpolation between a maximum clutch torque and the limiting clutch torque and thus in particular from that propeller shaft torque at which no further heating of the clutch oil occurs. When the oil or the clutch unit is not yet under any load (0 percent thermal load), the current clutch torque may correspond to the maximum clutch torque and clutch torque is thus not limited. When the oil or clutch unit is fully loaded (100 percent thermal load), the current clutch torque can be limited to the limiting clutch torque. The maximum admissible clutch torque is then the limiting clutch torque at which no additional heating of the oil any longer occurs.

The current torque of the drive train on the output element side, which is used for calculating the heat inputs, is preferably calculated from the current clutch torque.

The output element of the clutch unit is preferably a propeller shaft or the output element is connected for rotation to a propeller shaft. Torque is preferably controllably transmissible to a secondary axle, in particular a rear axle, of the motor vehicle by the clutch unit.

A torque transmission arrangement according to the invention comprises an input element, an output element, a clutch unit and a control device, wherein the clutch unit comprises at least one wet-running friction clutch for controllably transmitting torque from the input element to the output element, as well as a casing which contains the friction clutch and oil for cooling the friction clutch. The control device is here configured to carry out a method as previously described.

Further areas of applicability will become apparent from the description provided herein. The description and specific examples in this summary are intended for purposes of illustration only and are not intended to limit the scope of the present disclosure.

DRAWINGS

The drawing described herein are for illustrative purposes only of selected embodiments and not all possible implementations and are not intended to limit the scope of the present disclosure.

FIG. 1 is a schematic representation of a method according to the invention for controlling a clutch unit for a drive train of a motor vehicle.

DESCRIPTION OF THE INVENTION

FIG. 1 is a diagrammatic representation of a sequence of a method according to the invention for controlling a clutch unit for a drive train of a motor vehicle.

The clutch unit controlled by this method comprises an oil-cooled friction clutch for variably transmitting torque from an input element to an output element of the clutch unit. The output element of the clutch unit is here connected for rotation to a propeller shaft, such that torque is controllably variably transmissible to a rear axle of the motor vehicle by the clutch unit.

According to the method, in a step 1, heat inputs which contribute to heating the oil of the clutch unit are firstly calculated. The calculation comprises determining torque-dependent heat inputs as substep 1.1 of step 1 taking account of heat inputs from the current torque of the drive train on the output element side 7. The calculation furthermore takes account of rotational speed-dependent heat inputs, 1.2, making use of the current rotational speed of the drive train on the output element side 8 as the input variable.

In a step 2, which may proceed in parallel to step 1, heat outflows which contribute to cooling the oil of the clutch unit are calculated. Calculation of the heat outflows 2 which contribute to cooling the oil of the clutch unit comprises taking account of the heat outflows to adjacent components 2.1 and taking account of the heat outflows to the ambient air 2.2. Input variables for calculating the heat outflows are therefore the ambient air temperature 9, and possibly the component temperature of adjacent components 10.

As a function of the heat inputs 1 and the heat outflows 2, a current temperature of the oil of the clutch unit is calculated in step 6.

A conclusion as to the current thermal load 11 can be drawn from the current temperature of the oil 6.

A limiting clutch torque is additionally calculated as a function of the heat inputs 1 and heat outflows 2 in step 5, wherein the limiting clutch torque indicates that clutch torque at which the oil of the clutch unit is no further heated. The sum of the heat flows is therefore equal to zero at the limiting clutch torque.

As a function of the limiting clutch torque 5 and as a function of the current temperature of the oil of the clutch unit 6 or the thermal load 11 determined therefrom, a maximum admissible clutch torque is calculated in a step 3.

The maximum admissible clutch torque 3 is in particular calculated by interpolation between the calculated limiting clutch torque 5 and a maximum clutch torque, wherein the interpolation factor is dependent on the current temperature of the oil of the clutch unit 6 or the thermal load 11 determined therefrom.

The maximum admissible clutch torque 3 is therefore calculated as a function of the heat inputs 1 and the heat outflows 2.

In ongoing operation, the current clutch torque of the friction clutch, i.e. the torque actually applied to the friction clutch, is then limited, step 4, to the maximum admissible clutch torque determined thereby.

The current torque of the drive train on the output element side 7, which is used for calculating the heat inputs 1, is calculated in step 12 from the current, now limited, clutch torque of step 4.

LIST OF REFERENCE NUMERALS

1 Calculation of heat inputs
1.1 Torque-dependent heat inputs
1.2 Rotational speed-dependent heat inputs
2 Calculation of heat outflows
2.1 Heat outflows to adjacent components
2.2 Heat outflows to the ambient air
3 Calculation of maximum admissible clutch torque
4 Limitation of current clutch torque
5 Calculation of limiting clutch torque
6 Calculation of current temperature of the oil of the clutch unit
7 Current torque of the drive train on the output element side
8 Current rotational speed of the drive train on the output element side
9 Ambient air temperature
10 Component temperature of adjacent components
11 Calculation of current thermal load
12 Calculation of the current torque of the drive train on the output element side

The invention claimed is:

1. A method for controlling a clutch unit for a drive train of a motor vehicle, the method comprising:
controllably transmitting a current clutch torque from an input element to an output element of a wet running friction clutch of the clutch unit, wherein the clutch unit includes oil for cooling the wet running friction clutch,
calculating heat inputs that contribute to heating the oil of the clutch unit,
calculating heat outflows that contribute to cooling the oil of the clutch unit and,
calculating, as a function of the calculated heat inputs and heat outflows, a maximum admissible clutch torque, and
limiting the current clutch torque of the wet running friction clutch to the maximum admissible clutch torque.

2. The method as claimed in claim 1, wherein the heat inputs that contribute to heating the oil of the clutch unit that are calculated comprise torque-dependent heat inputs and/or rotational speed-dependent inputs, wherein the torque-dependent heat inputs comprise a current torque of a drive train on an output element side of the clutch unit, and the rotational speed-dependent heat inputs comprise a current rotational speed of the drive train on the output element side.

3. The method as claimed in claim 1, wherein the heat outflows that contribute to cooling the oil of the clutch unit that are calculated comprises heat outflows to adjacent components and/or heat outflows to ambient air.

4. The method as claimed in claim 1, further comprising, as a function of the calculated heat inputs and heat outflows, calculating a limiting clutch torque, and limiting the current clutch torque to the limiting clutch torque such that the oil of the clutch unit is not further heated.

5. The method as claimed in claim 4, further comprising calculating the maximum admissible clutch torque as a function of the limiting clutch torque and a current temperature of the oil of the clutch unit that is calculated as a function of the heat inputs and the heat outflows.

6. The method as claimed in claim 5, further comprising calculating the maximum admissible clutch torque by interpolation between the limiting clutch torque and a maximum clutch torque, wherein an interpolation factor is dependent on the current temperature of the oil of the clutch unit.

7. The method as claimed in claim 1, further comprising calculating, as a function of the heat inputs and the heat outflows, a current temperature of the oil of the clutch unit.

8. The method as claimed in claim 1, further comprising calculating, from the current clutch torque, a current torque of the drive train on an output element side of the clutch unit, which is used for calculating the heat inputs.

9. The method as claimed in claim 1, further comprising controllably transmitting torque to a secondary axle of the motor vehicle by the clutch unit, wherein the output element of the clutch unit is a propeller shaft or is connected for rotation to a propeller shaft.

10. The method as claimed in claim 1, further comprising providing a torque transmission arrangement with the input element, the output element, the clutch unit, and a control device, wherein the clutch unit comprises the wet-running friction clutch for controllably transmitting torque from the input element to the output element, as well as a casing which contains the wet running friction clutch and the oil for cooling the wet running friction clutch.

11. A method for controlling a clutch unit for a drive train of a motor vehicle, the method comprising:
controlling a current clutch torque from an input element to an output element of a wet running friction clutch that includes oil for cooling the friction clutch, wherein the friction clutch is disposed in a drive train having an input element side and an output element side;
receiving heating input variables corresponding to heat inputs that cause the oil to be heated in the friction clutch
calculating the heat inputs from the heating input variables,
receiving cooling input variables corresponding to heat outflows that cause the oil to be cooled in the friction clutch
calculating the heat outflows from the cooling input variables,
calculating, as a function of the calculated heat inputs and heat outflows, a limiting clutch torque, wherein the limiting clutch torque corresponds to a clutch torque where the oil of the friction clutch is not further heated when the limiting clutch torque is applied.

12. The method of claim 11, further comprising calculating, as a function of the calculated heat inputs and heat outflows, a maximum admissible clutch torque and limiting the current clutch torque of the friction clutch to the calculated maximum admissible clutch torque.

13. The method of claim 12, wherein a sum of the heat inputs and the heat outflows is zero at the limiting clutch torque.

14. The method of claim 12, wherein the maximum admissible clutch torque is greater than the limiting clutch torque.

15. The method of claim 14, wherein the maximum admissible clutch torque is interpolated between the calculated limiting clutch torque and a maximum clutch torque using an interpolation factor dependent on a current temperature of the oil in the friction clutch.

16. The method of claim 15, wherein the interpolation factor is dependent on a thermal load determined from the current temperature of the oil.

17. The method of claim 12, wherein after limiting the current clutch torque to the maximum admissible clutch torque, calculating a current clutch torque on the output element side from the current clutch torque that is being limited to the maximum admissible clutch torque, and calculating the heat inputs from the current clutch torque on the output side.

18. The method of claim 11, wherein the heating input variables include a current torque of the drive train on the output element side and a current rotational speed of the drive train on the output element side.

19. The method of claim 18, wherein the cooling input variables include ambient air temperature and a component temperature of components adjacent to the friction clutch.

20. The method of claim 11, further comprising calculating a current temperature of the oil in the friction clutch from the heat inputs and the heat outflows.

* * * * *